US007870540B2

(12) United States Patent
Zare et al.

(10) Patent No.: US 7,870,540 B2
(45) Date of Patent: Jan. 11, 2011

(54) DYNAMIC OBJECT VALIDATION

(75) Inventors: Robert B. Zare, Issaquah, WA (US); Andriy Garbuzov, Redmond, WA (US); Adrian Dumitrascu, Bellevue, WA (US); Matthew E. Carroll, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1198 days.

(21) Appl. No.: 11/032,960

(22) Filed: Jan. 11, 2005

(65) Prior Publication Data

US 2006/0010258 A1 Jan. 12, 2006

Related U.S. Application Data

(60) Provisional application No. 60/586,500, filed on Jul. 9, 2004.

(51) Int. Cl.
*G06F 9/44* (2006.01)

(52) U.S. Cl. ........................ 717/126; 717/109; 717/112; 717/125

(58) Field of Classification Search ........................ None
See application file for complete search history.

(56) References Cited

U.S. PATENT DOCUMENTS

| | | | | |
|---|---|---|---|---|
| 6,330,006 | B1 * | 12/2001 | Goodisman | 715/762 |
| 7,398,268 | B2 | 7/2008 | Kim | |
| 7,478,370 | B2 * | 1/2009 | Nadon et al. | 717/126 |
| 2004/0010505 | A1 | 1/2004 | Vishnubhotla | |
| 2004/0044985 | A1 * | 3/2004 | Kompalli et al. | 717/100 |
| 2004/0064825 | A1 * | 4/2004 | Lim et al. | 719/319 |
| 2004/0194057 | A1 * | 9/2004 | Schulte et al. | 717/114 |
| 2004/0249867 | A1 | 12/2004 | Kraiss et al. | |
| 2004/0250255 | A1 | 12/2004 | Kraiss et al. | |
| 2005/0039166 | A1 * | 2/2005 | Betts et al. | 717/114 |
| 2005/0154748 | A1 | 7/2005 | Kraiss | |

FOREIGN PATENT DOCUMENTS

WO WO 02/21314 A2 * 3/2002

OTHER PUBLICATIONS

Zukerman et al., "Predictive Statistical Models for User Modeling", 2001, Kluwer Academic Publishers, pp. 5-18.*

Ko et al., "Designing the Whyline: A Debugging Interface for Asking Questions about Program Behavior", Apr. 24, 2004, ACM, pp. 151-158.*

Kohsuke Kawaguchi, "The JAXB API", Jan. 8, 2003, XML.com, pp. 1-7 <http://www.xml.com/pub/a/2003/01/08/jaxb-api. html>.*

David Eng, "Combining Static and Dynamic Datqa in Code Visualization", Nov. 18, 2002, ACM, pp. 43-50.*

David Eng, "JIL: an extensible intermediate language", Jun. 2002, Technical Report Sable-2002-3, McGill University, Sable Research Group, pp. 1-7.*

* cited by examiner

*Primary Examiner*—Michael J Yigdall
*Assistant Examiner*—Ben C Wang
(74) *Attorney, Agent, or Firm*—Workman Nydegger

(57) ABSTRACT

A system that facilitates validating an object in a software design tool comprises a component that receives input relating to development of an object. A validating component, prior to compile, automatically determines whether the object is associated with an error upon receipt of the input. An alarm component can generate an alarm upon the validating component determining that the object is associated with an error.

18 Claims, 15 Drawing Sheets

DYNAMIC OBJECT VALIDATION

REFERENCE TO RELATED APPLICATIONS

This application claims the benefit of U.S. Provisional Application Ser. No. 60/586,500 filed on Jul. 9, 2004, and entitled SYSTEMS AND METHODS OF FACILITATING DATA MINING. This application is also related to U.S. Pat. No. 7,398,268, filed on Feb. 2, 2005 and issued Jul. 8, 2008. The entireties of these applications are incorporated herein by reference.

TECHNICAL FIELD

The subject invention relates generally to computer software development, and more particularly to object validation in a software design environment.

BACKGROUND OF THE INVENTION

Computers and computer-based devices have become a necessary tool for many applications throughout the world. Typewriters and slide rules have become obsolete in light of keyboards coupled with sophisticated word-processing applications and calculators that include advanced mathematical functions/capabilities. Thus, trending applications, analysis applications, and other applications that previously may have required a collection of mathematicians or other high-priced specialists to painstakingly complete by hand can now be accomplished through use of computer technology. For instance, due to ever-increasing processor and memory capabilities, if data is entered properly into an application/wizard, such application/wizard can automatically output a response nearly instantaneously (in comparison to hours or days generating such response by hand previously required).

Such applications/wizards, however, require designing by skilled application developers and can be hundreds, thousands, or even millions of lines of computer code. Furthermore, these applications can include extremely complex algorithms that need to be coded precisely in order to enable the application to operate as desired. To further complicate development of applications, a single error can compound throughout code, rendering debugging of such code time-consuming and extremely problematic. For instance, a mere typo or incorrect definition can cause multiple errors to occur during an application build.

In another more particular example, complex projects (e.g., within an application and/or an entirety of an application) can include hundreds, thousands, or even millions of objects. Often, such objects are represented visually in tools designed specifically for object-oriented application development, and each object can be associated with tens, hundreds, or even thousands of properties. Given the numerous objects and definitions, creation of an incorrect definition (rendering one or more objects invalid) can frequently occur. Such errors are conventionally not located, however, until a developer attempts to build all or part of an application. Further, due to various object dependencies and relationships, a single incorrect definition can cause a cascading chain of errors. Developers (who may have spent hours, days, or weeks attempting to develop a project/application) can become extremely frustrated at a build when numerous errors are presented to such developer during the build.

Another disadvantage associated with conventional designers is that a developer is required to repeatedly build a project/application to be presented with object-related errors. Thus, for instance, a developer that forgets to constantly build an application/project under development can be presented with an inordinate number of errors relating to a plurality of objects/definitions. Such presentment can cause a developer significant frustration and result in a developer directing angst towards the design tool and/or their profession. Furthermore, a lack of immediate feedback can leave a developer guessing and/or confused as to an origination of a definitional/object error.

Accordingly, there exists a need in the art for a system and/or methodology for providing more timely feedback to developers that are developing applications via application design tools.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention relates to novel systems/methodologies for determining whether an object in a software design tool is invalid in real-time (e.g., as object-related input is received by the software design tool). Accordingly, the subject invention can determine whether an object is valid or invalid without requiring compilation of such object. Moreover, the subject invention can determine whether a collection or organization of objects is invalid in real-time. For example, objects can be arranged in a hierarchical manner, where the hierarchy includes disparate levels. The subject invention can be employed to determine whether levels of the hierarchy specifically (and a totality of the hierarchy generally) are valid without needing to compile such hierarchy.

Upon determining that one or more objects are invalid, an alarm generating component can be utilized to generate an alarm that indicates that the one or more objects are associated with invalidities. For example, the alarm can be visual in nature and can be displayed promptly upon receiving input that renders the object(s) invalid. More particularly, the alarm can include highlighting or underlining text or graphics associated with the object. Furthermore, a color of underline/highlight can be employed to indicate a type of invalidity. For example, a red underlining of text and/or graphics can indicate that an associated object includes a critical error, while a green underlining of text and/or graphics can indicate that an associated object includes a non-critical warning. While underlining has been provided as an exemplary alarm, it is understood that any suitable alarm can be employed in connection with the subject invention. In yet another example, the alarm can be audible in nature rather than visual, or can be a combination of audible and visual alarms. Thus, the subject invention can inform a user promptly upon an object being rendered invalid by particular user-input, thus mitigating occurrences of a user being presented with a multitude of errors/warnings upon compiling code. Such prompt feedback positively affects software development efficiency and increases usability of a software design tool.

In accordance with another aspect of the subject invention, information relating to an invalid object can be presented to a user upon activation of a pre-defined trigger. For instance, an object can be found to be invalid and a visual alarm can be associated therewith. More particularly, text and/or graphics relating to the object can be underlined. Thereafter, a cursor can be hovered over the object that is found to be invalid, and upon such hovering greater detail relating to the determined invalidity can be provided to the user. Thus, information relating to dependencies, organization of objects, attributes, and any other suitable properties associated with objects can be presented to a user upon activation of the trigger. While a hover has been exemplified as one particular manner for causing information to be displayed to a user, it is to be understood that any suitable activation method (e.g., voice activation, a keystroke or sequence of keystrokes, mouse clicks, . . . ) can be employed to cause invalidity information to be presented to a user.

In yet another aspect of the subject invention, solutions/actions that will render an invalid object valid can be presented to a user. More particularly, an object can be found to be invalid in accordance with the subject invention, and an alarm can be associated therewith. Upon occurrence of a pre-defined action (e.g., a hover of a cursor, keystrokes, . . . ), information relating to the invalidity and/or action(s) that will render the object valid can be presented to a user. For instance, a plurality of action(s) that will render the object valid can be presented to a user, wherein the action(s) are arranged in a manner corresponding to a probability that such action(s) reflect a user's intent. Specifically, an action that may render an object and/or organization of object(s) valid may not match a user's intent—thus, the subject invention can analyze user history and user context to determine probabilities associated with action(s) that will render the object(s) valid. Such action(s) can be selectable by a user, and upon selection of one of the action(s) such action will be implemented and the object will be rendered valid. Therefore, the subject invention further increases efficiency with respect to developing a software application.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the subject invention is intended to include all such aspects and their equivalents. Other objects, advantages and novel features of the invention will become apparent from the following detailed description of the invention when considered in conjunction with the drawings.

DETAILED DESCRIPTION OF THE INVENTION

Figure 1:
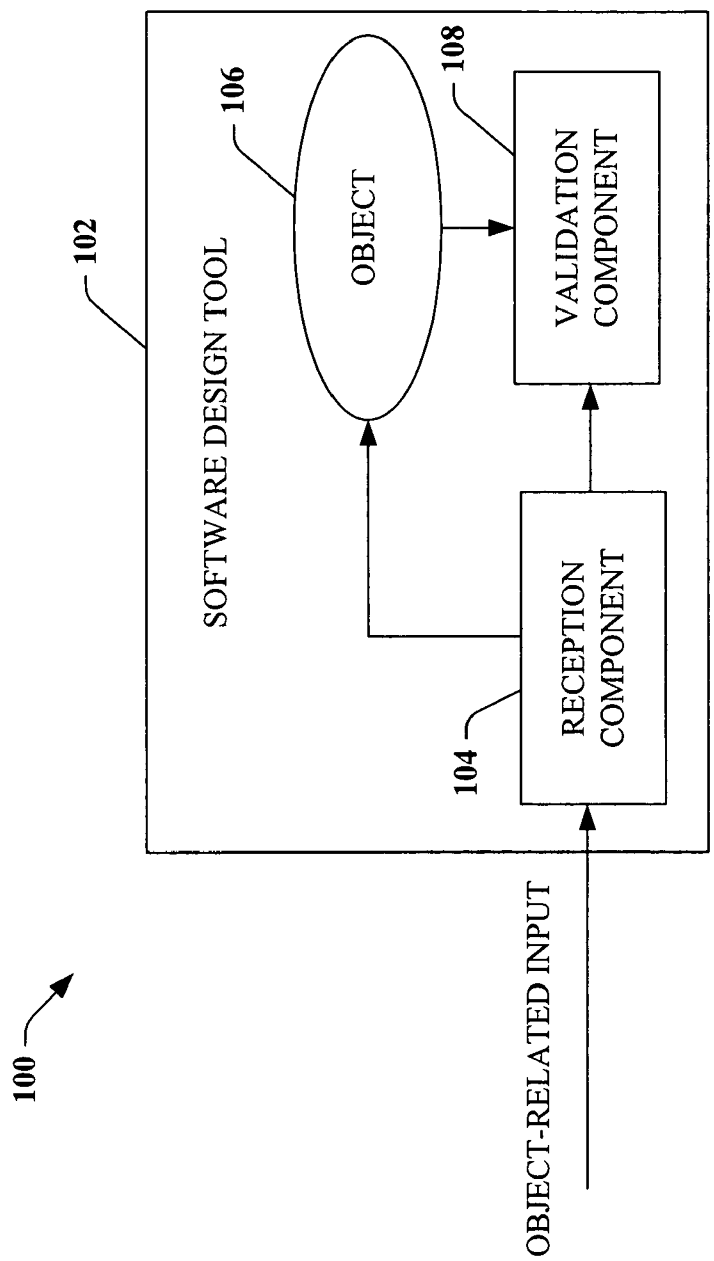
FIG. 1 is a high-level block diagram of a system that facilitates dynamically validating an object in a software design tool in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Referring now to the drawings, FIG. 1 illustrates a high-level system overview in connection with one particular aspect of the subject invention. The subject invention relates to a novel system 100 that facilitates validation of objects and determination of object invalidity within a software design tool 102. Objects are packages of data and functionality together within single units employed in computer programming, and are the basis of modularity and structure in object-oriented programming. Objects are associated with identities that are separate from identities of other objects, although objects relate to each other via messages. Such messages can be instructions that are received or delivered by object(s) based upon an object's (or other object's) data and/or functionality (e.g., methods). Data within objects can include numbers, literal strings, variables, references, and other suitable data. The data relates to properties of the objects, such as class definitions and object-dependency indicia. Object-oriented programming can be employed to model problems existent in real-life environments by simulating such problems via a class-based language. Structure and behavior of objects are defined by a class, which is a definition of all objects of a specified type. Objects are explicitly created as a function of a class, and an object so created is considered to be an instance of such class. Objects can further be associated with method pointers, member access control, implicit data members utilized to locate instances of a class in a class hierarchy, and the like. Moreover, an object's data and/or functionality can be based on data and/or functionality of disparate objects(s), from which the former object inherits. Inheritance enables commonalities amongst differing types of objects to be expressed a single time and thereafter utilized multiple times in multiple contexts. Accordingly, development of a project and/or application can utilize objects with multiple dependencies and properties that must correspond with disparate dependencies/properties if such project/application is to compile and operate properly.

To facilitate validation of object(s) within the software design tool 102, the system 100 employs a reception component 104 that receives object-related input. For instance, the object-related input can be in a textual form originating at a keyboard and delivered to the reception component 104 therefrom. In another example, the object-related input can originate from an act or series of acts involving a pointing and clicking mechanism (e.g., a mouse, a pressure sensitive screen, . . . ), wherein visual representations of objects and/or properties associated therewith can be selected, dragged, and dropped to create/modify an object, class, hierarchy, or other suitable structure. Moreover, voice recognition systems/methodologies can be utilized in connection with the reception component 104 receiving the object-related input. Thus, for instance, classifiers or other suitable learning components can be employed in connection with the system 100 to train a voice recognition system to learn a user's voice. Thereafter, object-related input delivered to the reception component 104 audibly can be processed and implemented within the software design tool 102 if desired. The object-related input can add, delete, and/or alter dependencies of objects, class structures, hierarchies, attributes, and any other suitable property that can be associated with an object 106 resident within the software design tool 102.

The object 106 can be affected by the object-related input, and a validation component 108 can dynamically analyze the object 106 (and other objects) affected by the object-related input. Thus, for example, if the object-related input alters a dependency of the object 106 and such dependency alteration renders the object 106 invalid, the validation component 108 will dynamically determine that the object 106 is invalid without requiring a compilation of code. In general terms, a compilation is a translation of source code (e.g., C, C++, object-oriented code, . . . ) to machine language that can be directly executed by a computer or a virtual machine. Another example of a compilation is a translation from a first high-level language to a second high-level language (or an intermediate language). If the compilation results in errors or warnings, conventional systems present such errors or warnings to a developer and the code will not compile. The validation component 108 can determine that the object 106 (or other objects associated with the object-related input) is invalid at a time substantially proximate to a time of receipt of the object-related input by the reception component 104 (without requiring a compilation of the object 106). Therefore, a developer can be presented with object invalidities (and reasons for such invalidities) in real-time, and can make appropriate corrections while programming with respect to the object 106 is fresh in such developer's mind. In contrast, conventional object validation systems require a compile, which a developer may forget to initiate for an extended period of time. When the developer does initiate the compile, the developer may be presented with numerous errors, causing such developer angst towards a design tool and extreme frustration. Accordingly, development efficiency is adversely affected by not providing a developer with prompt feedback with respect to warnings/errors relating to the object 106.

The validation component 108 can be implemented in several disparate manners. For instance, the validation component 108 can be programmed to search for particular markers within an object, wherein such markers identify properties of interest. Thereafter, the validation component 108 can cache data associated with the markers and parse a remainder of objects associated with the software tool 102 to ensure that such markers are valid. Moreover, several types of invalidity errors/warnings can be pre-defined within the validation component 108, and the validation component 108 can then search code/objects for such errors.

In accordance with one aspect of the subject invention, the validation component 108 can operate as a background component within a computer operating system. For instance, the validation component 108 can be activated upon detection of a user action, such as receipt of the object-related input by the reception component 104. In another exemplary embodiment, the validation component 108 can be programmed to monitor various objects and/or input relating to the software design tool 102 periodically (e.g., every 10 milliseconds). Thus, the validation component 108 can continuously analyze object-related input together with object(s) associated therewith, and determine whether objects remain valid given such input. More particularly, the validation component 108 can analyze object dependencies, classes, hierarchies, properties, etc. for validity (e.g., consistency between dependencies, . . . ). If the object 106 (or other objects) is found to be invalid, a user can be presented with such invalidities promptly. For instance, if the validation component 108 finds the object 106 to be invalid, such object 106 can be highlighted in a manner that will portray to a user that the object 106 is invalid. For example, if the object 106 is represented graphically, the graphical representation can be underlined and/or highlighted. Similarly, if the object 106 is displayed textually, all are part of the text representing the object 106 can be underlined or highlighted in a similar manner. In a disparate example, speakers can be employed to audibly inform a user that the object 106 is invalid and reasons for such invalidity.

In accordance with yet another aspect of the subject invention, the system 100 can be customized by a user to fit such user's software development needs/desires. For instance, many visual design tools include numerous display pages where disparate objects and/or displays reside. Therefore, a user can provide object-related input with respect to an object on a first display page that renders an object on a disparate display page invalid. Some users may prefer to be notified promptly that an object on a separate display page is invalid, while other users may prefer to wait until a display page corresponding to the invalid object is selected and presented prior to being notified of invalidity of an object. The system 100 can be customized by a developer depending upon such developer's preferred manner of invalidity information presentation. Other levels of customization are contemplated by the inventors of the subject invention and will be described in more detail with respect to various figures below.

Figure 2:
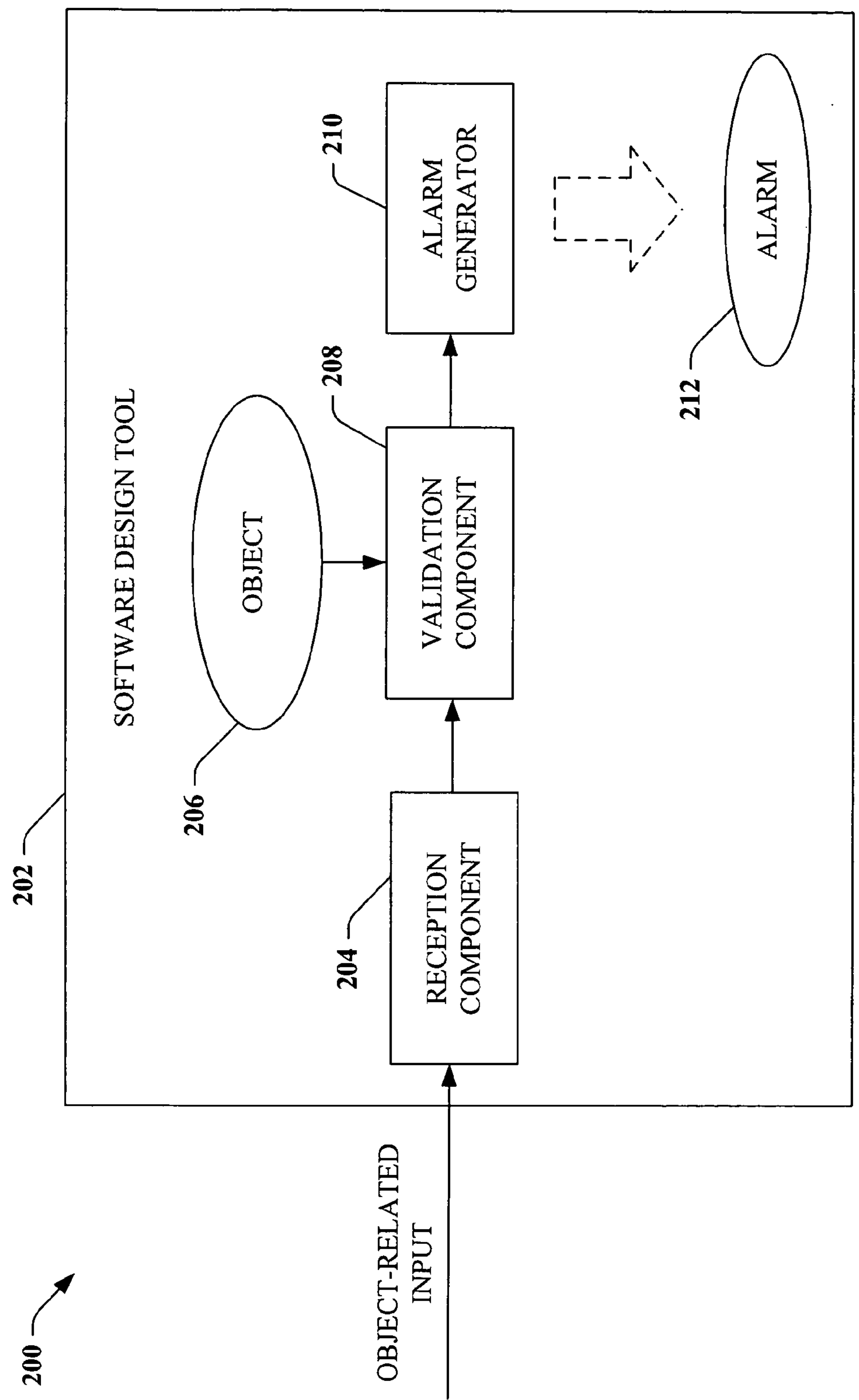
FIG. 2 is a block diagram of a system that facilitates generating an alarm with respect to an invalid object in accordance with an aspect of the subject invention.

Turning now to FIG. 2, a system 200 that facilitates automatically validating an object within a software design tool 202 without requiring a compilation of objects/code associated therewith is illustrated. In accordance with one aspect of the subject invention, the software design tool 202 can be a visual designer, where "drag and drop" controls are utilized in connection with designing an object model—more specifically, these controls are employed to visually create a data model. The system 200 includes a reception component 204 that receives object-related input. The object-related input can originate from a user via a user interface and/or internally from a computer process or program that interacts with the software design tool 202. An object 206 under development in the software design tool 202 is affected by the object-related input; for example, a property or dependency associated with the object 206 can be added, altered, or deleted. Upon the reception component 204 receiving the object-related input, a validation component 208 associated with the reception component 204 analyzes the object 206 (and other objects associated with the object-related input) and determines whether the object 206 (or other object(s) associated with the object-related input) is valid.

If the validation component 208 determines that the object 206 is invalid (or associated with warnings or other errors), it passes such information to an alarm generator 210. The alarm generator 210 creates an alarm 212 that can be presented to a user, wherein the alarm 212 notifies such user that the object 206 is invalid. For example, the alarm 212 can be visual in nature, providing the user with a visual cue that informs such user of an invalidity. Furthermore, the alarm 212 can be generated to specify a type of invalidity to the user. For example, the alarm can comprise an underlining of graphical representations and/or text relating to an object that is invalid, wherein a color of the underlining indicates a type of invalidity. Specifically, a red underline can be employed to indicate an error that requires correction prior to completing a project, and a green underline can be employed to indicate a warning that will not render the project inoperable but may cause future issues. While underlines have been employed as an example, it is to be understood that any suitable visual cue to a user is contemplated and intended to fall under the scope of the hereto-appended claims. For instance, highlighted text/graphics or any other suitable visual alarm can be employed within the system 200.

The alarm 212 can also be an audio alarm, a combination of audio and visual alarm, a physical alarm (e.g., a vibrating mouse), or any other suitable alarm that can convey to the user that the object 206 is invalid. In accordance with an aspect of the subject invention, the alarm generator 210 can be customized to create alarms that are desired by a user. For instance, a particular user may not wish to be provided alarms relating to non-critical warnings, but rather wishes to only be informed of critical errors associated with the object 206 (or other objects in the software design tool 202). Moreover, the user may wish only to receive alarms relating to objects currently being operated on and/or reviewed, and not receive alarms relating to objects in disparate views and/or not currently contemplated by the user. Furthermore, types of alarms, amount of content provided to a user with respect to the alarm, and various other alarm-related indicia can be customized by a user. For instance, a wizard can be provided at setup of the software design tool 202 that enables a user to customize the alarm generator 210 and alarms generated thereby. The alarm generator 210 can also be customized through utilization of various pull-down menus and the like.

In accordance with another aspect of the subject invention, one or more components within the system 200 can be located on a host server and/or one or more components can be located upon a client. For example, the user can enter object-related input at a user interface resident proximate to a client machine. The reception component 204 can receive the object-related input, and deliver such input to the validation component 208 that exists on a remote server. Similarly, the object 206 can exist at a remote location and/or can be stored in a data store (not shown) upon the client. The validation component 208 can then determine whether the object 206 is valid as a function of data/methods of the object 206 together with the object-related input, and deliver such determination over a network (wireless or wireline) to the alarm generator 210. The alarm generator can thereafter create the alarm 212, thereby presenting the user with an alarm relating to invalidity of the object 206. It is understood that the above is simply an example of an implementation where a client and server can implement disparate functionalities of the subject invention. For instance, the alarm generator 210 can exist on a server, and the alarm 212 can be delivered over a secured network connection to a client that is being employed by a user. Thus, any suitable distribution of components of the system 200 distributed between a client and a server is contemplated.

Figure 3:
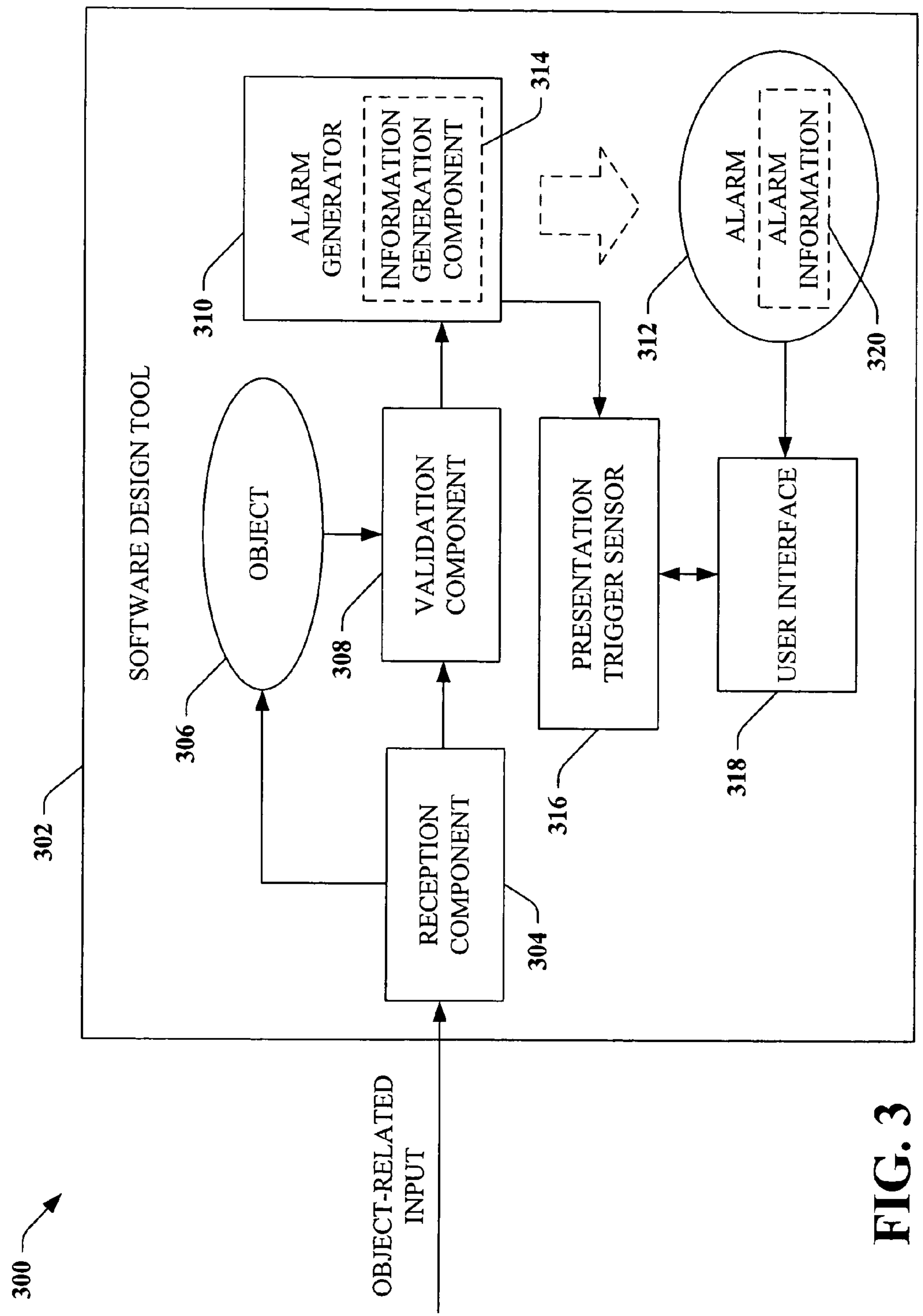
FIG. 3 is a block diagram of a system that facilitates providing information relating to an object to a user if the object is determined to be invalid in accordance with an aspect of the subject invention.

Now referring to FIG. 3, a novel system 300 that facilitates determining validity of objects within a software-developing environment is illustrated. The system 300 includes a software design tool 302 that is utilized for development of a software project/application. The software design tool 302 is associated with a reception component 304 that receives object-related input from a user and/or computer component. The object-related input affects an object 306 by adding, deleting, or modifying a property or data associated with a function and/or data previously existent within the object 306. A validation component 308 analyzes the object-related input together with the object 308 and determines whether the object is invalid. For example, inconsistent dependencies can render an object invalid, and the validation component 308 can detect such invalidity. An alarm generator 310 is communicatively connected to the validation component 308 and generates an alarm 312 that notifies a user of an invalidity with respect to the object 306. The alarm generator 310 is related to an information generation component 314 that is employed to generate more detail relating to the alarm 312. For instance, the information generation component 314 can generate details relating to a nature of an alarm, reasons for generation of the alarm, and other suitable information. In a specific example, an attribute can be incorrectly utilized multiple times in a hierarchy. The information generation component 314 can create textual or other indicia informing the user that a same attribute is employed in a particular hierarchy over different levels of such hierarchy.

A user, however, may only wish to review information relating to the alarm 312 at particular times. For example, if the user is in a process of updating the object 306, then such user may not wish to receive information relating to the alarm 312 caused by updating of the object 306. Therefore, the system 300 includes a presentation trigger sensor 316 that senses when the user wishes to review information relating to the alarm 312. For example, the user can hover a cursor or other suitable pointing mechanism over the alarm 312 (which is displayed upon a user interface 318, such as a display). On hover, alarm information 320 associated with the alarm 312 can be presented to the user via the user interface 318. Other manners for triggering the presentation trigger sensor 316 are also contemplated. For example, the presentation trigger sensor 316 can be voice-activated, wherein a user audibly requests that the alarm information 320 be presented to such user. Furthermore, while the user interface 318 can be a graphical display, such interface 318 can also be a variety of disparate devices that can be utilized to convey the alarm 312 and alarm information 320 to the user. For example, the user interface 318 can be associated with one or more speakers that audibly relay the alarm 312 to the user and alarm information 320 associated therewith. Moreover, a combination of audio, visual, and physical sensory mechanisms can be employed in connection with the user interface 318. Thus, upon the information generation component 314 generating the alarm information 320, the presentation trigger sensor 316 will monitor action with respect to the user interface 318 and facilitate displaying the alarm information 320 when such presentation trigger sensor 316 is activated (e.g., by way of hovering a cursor over all or part of the alarm 312).

Figure 4:
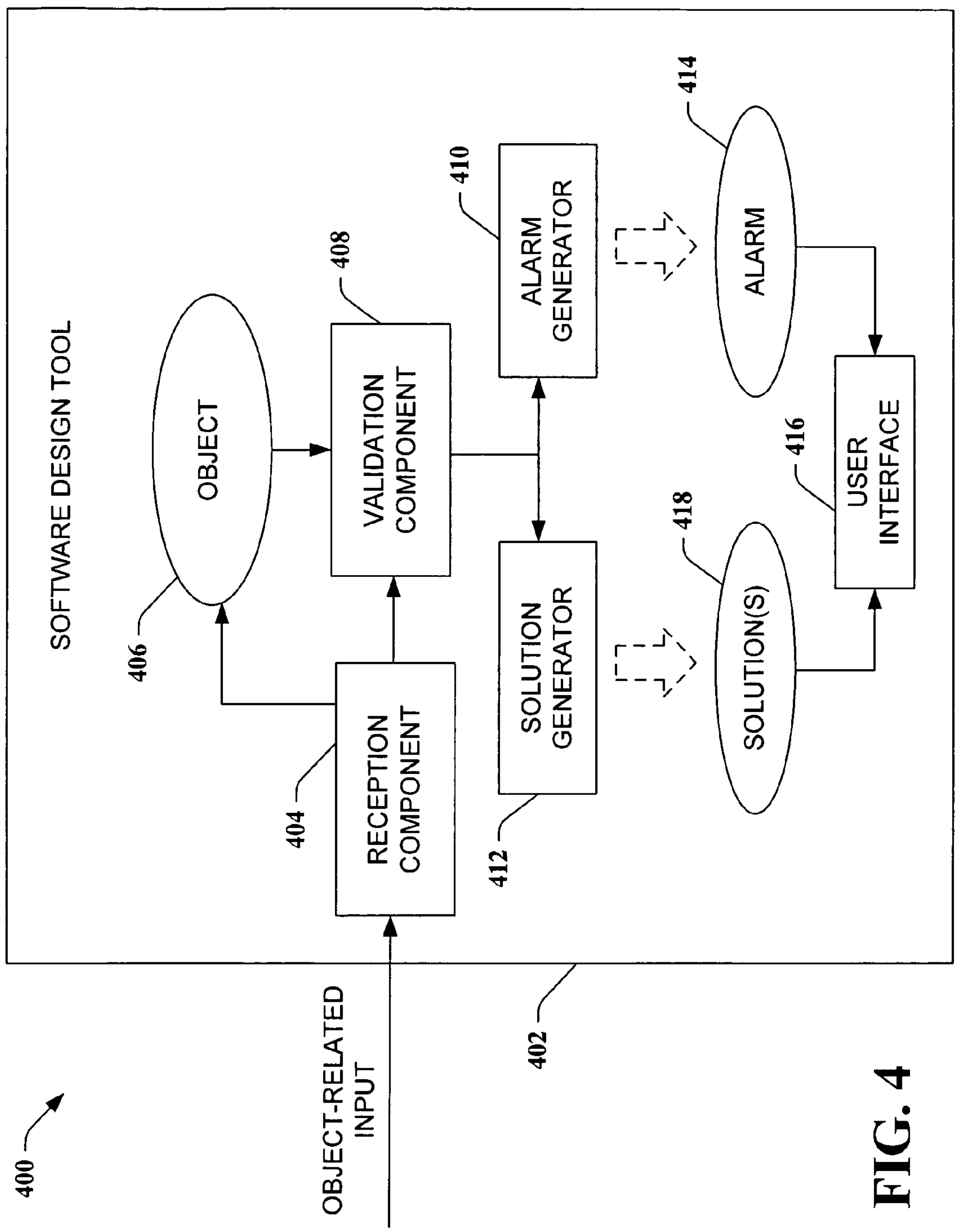
FIG. 4 is a block diagram of a system that facilitates automatically generating solutions that will render an invalid object valid in accordance with an aspect of the subject invention.

Now referring to FIG. 4, a system 400 that facilitates real-time validation of a software object is illustrated. The system 400 includes a software design tool 402 (e.g., a visual designer) that receives object-related input with respect to one or more objects under development/modification within the software design tool 402. More specifically, a reception component 404 associated with the software design tool 402 receives the object-related input, and an object 406 is affected by such input. A validation component 408 analyzes the object 406 together with the object-related input and determines whether the object 406 (or other object(s) associated with the object 406 or object-related input) is valid in real-time to enable provision of dynamic feedback to a user (in contrast to a user being presented with numerous errors upon a compile).

The validation component is communicatively coupled to an alarm generator 410 and a solution generator 412. The alarm generator 410 generates an alarm 414 and relays such alarm 414 to a user interface 416. The user can thereby receive real-time feedback with respect to errors associated with the object 406 in particular, and with a project in general. For example, the user interface 416 can be a display, such as a cathode ray tube (CRT) screen, a liquid crystal display (LCD), or any other suitable display. Furthermore, the user interface 416 can be associated with a personal digital assistant (PDA), a desktop PC, a laptop PC, a smartphone, or any other suitable device associated with a display. Moreover, the software design tool 402 can be located in memory of any of such device(s) in its entirety, or particular components of the software design tool can stored in any or several of such devices.

The solution generator 412 is employed to analyze errors/warnings located by the validation component 408 and determine one or more solution(s) that can render the object valid 406. For a specific example, an attribute can be incorrectly named on disparate levels of a hierarchy within an object model. A solution to such problem may be to alter the name of the attribute on one or more levels of the hierarchy. Thus, the solution generator 412 can determine a combination of alterations that would render the hierarchy valid (and the object 406 valid). The solution generator 412 can therefore generate solution(s) 418 that would correct errors/warnings found by the validation component 408 and presented to the user via the alarm generator 410. The solution(s) can be presented to a user by way of the user interface 416, and such solution(s) can be selectable by the user. Specifically, the user can select one or more of the solution(s) 418 and such solution(s) will be implemented within the software design tool 402 automatically. Thus, the selected solution(s) 418 can be implemented without requiring the user to manually alter data and/or functions associated with one or more objects, thereby increasing developer efficiency.

In accordance with another aspect of the subject invention, the solution generator 412 can generate probabilities associated with each of the solution(s) 418 presented to the user by way of the user interface 416. For example, the solution(s) 418 presented to the user can each be associated with a probability of correctness of each of such solution(s), wherein such probabilities are calculated by the solution generator 412. For instance, altering an attribute may be a first solution provided by the solution generator 412 associated with a high probability of correctness, and modifying a dependency may be a second solution provided by the solution generator 412 associated with a lower probability of correctness. These two solutions can be presented to the user in order of probability upon the user interface 416. A user can select a desirable solution via the user interface 416, and such solution can be automatically implemented. Furthermore, a user can make alterations manually if the solution(s) 418 do not adequately represent the user's intent. Thus, if the presented solutions 418 do not include a solution desired by the user, such user can manually alter the object 406 accordingly. In particular, the alarm 414 can provide the user with reasons for presentation of such alarm 414, and the user can manually modify the object 406 accordingly. In accordance with yet another aspect of the subject invention, the solution generator 412 can present the user with solution(s) that are above a predefined threshold probability. For example, only solutions above a 25% probability of correctness can be presented to the user. Similarly, it may be desirable to only present a particular number of solutions associated with highest probability to the user. For instance, five solutions associated with the five highest probability level(s) can be presented to the user.

Figure 5:
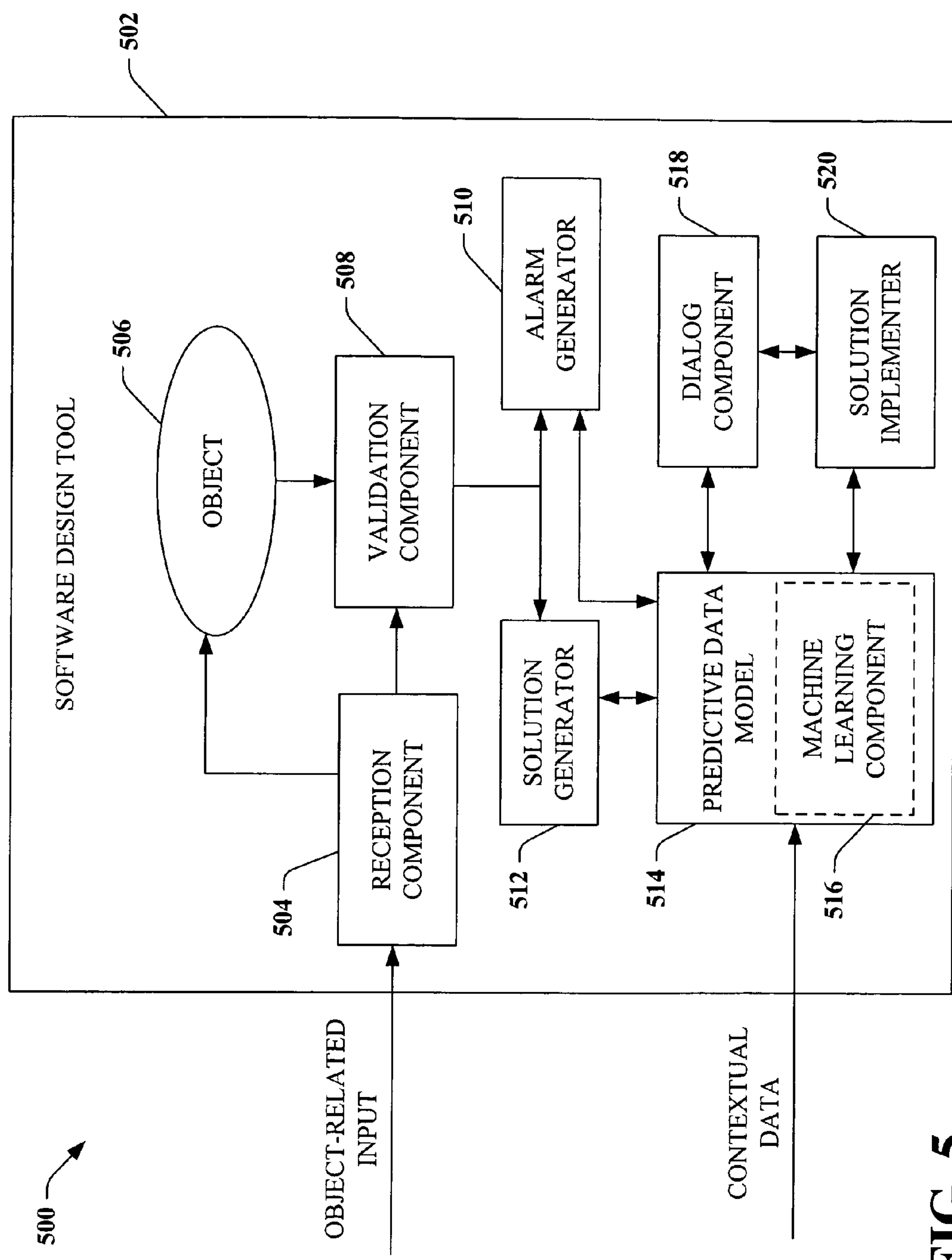
FIG. 5 is a block diagram of a system that facilitates automatic implementation of a determined action that corrects an object invalidity in accordance with an aspect of the subject invention.

Now referring to FIG. 5, a system 500 that facilitates automatic implementation of a solution with respect to a detected validation error/warning associated with a software project is illustrated. The system 500 includes a software design tool 502 that is utilized by a project developer to generate software. For example, the software design tool 502 can be a visual designer, wherein a developer visually builds a model through a "drag and drop" user interface. Other software design tools (e.g., textual design tools) are also contemplated and intended to fall under the scope of the hereto-appended claims. The software design tool 502 is associated with a reception component 504 that receives input related to an object 506 (or other objects created and/or under development within the software design tool 502). The reception component 504 relays the object-related input to the object 506, and a validation component 508 analyzes the object 506 to determine if such object is associated with any warnings and/or errors. Moreover, the validation component 508 determines whether there are any errors in real-time, and an analysis of the object can be triggered by the reception component 504 receiving the object-related input. This aspect of the subject invention enables the validation component 508 to operate as a background program, thereby not utilizing processing resources when the software design tool 502 is not being utilized by a developer.

The validation component 508 is communicatively coupled to an alarm generator 510 and a solution generator 512. If the validation component 508 determines that the object 506 (or other associated object(s)) is invalid, such invalidity can be communicated to the alarm generator 510, which creates and presents alarms relating to the invalidity to a user (e.g., a developer). For example, the alarm generator 510 can highlight graphical representations of objects and/or texts associated with objects to inform a user that the object 506 is invalid. Moreover, the alarm generator 510 can generate information relating to the alarm (e.g., reason(s) for invalidity) and present such information to the user. The solution generator 512 can receive an invalidity and reasons therefore from the validation component 508 and/or the alarm generator 510, and generate one or more solution(s) that would render the object 506 valid. For example, the solution generator 512 can create a plurality of solutions that would render the object 506 valid, and further determine a probability associated with each solution. More particularly, the solution generator 512 can determine with a 75% probability that one particular action will render the object 506 valid and matches a user's intent. Thus, for each generated solution a determined probability can be associated therewith.

The solution generator 512 can be associated with a predictive data model 514 that can facilitate generating solutions and probabilities associated therewith as a function of contextual data. The predictive data model, for instance, can facilitate generating solutions and probabilities associated therewith by receiving and analyzing contextual data such as time of day, day of week, user identity, current weather situation, and other suitable data. In one particular example, the predictive data model 514 can employ one or more Bayesian networks in connection with generating solutions and associated probabilities. Bayesian networks are directed acyclic graphs of nodes that represent variables and arcs that represent dependence relations between nodes (variables). Thus, for example, if an arc exists from a first node to a second node, then the first node is said to be a parent of the second node. If the node is associated with a known value, it is referred to as an evidence node. Nodes can represent any suitable type of variable—for instance, nodes can represent observed measurements, parameters, latent variables, or hypothesis. Therefore, one node can represent a time of day, another node can represent day of week, a third node can represent user identity, and an arc between nodes illustrates representations therebetween. Users of the software design tool 502 can be monitored and analyzed over time as sample cases, and a Bayesian network can be built based upon data collected from such users. The predictive data model 514 can also employ a machine learning component 516 in connection with generating solutions and associated probabilities. Machine learning refers to an area of artificial intelligence concerned with development of techniques that allow computers and/or programs to "learn". More particularly, machine learning can relate to methods for creating and/or modifying computer programs based at least in part upon an analysis of data set(s). Thus, the predictive data model 514 can operate more efficiently over time as more contextual data, user history, application history, and the like is collected.

Furthermore, the machine learning component 516 (and thus the predictive data model 514) can make inferences relating to determining solution(s) and probabilities associated therewith. As used herein, the terms to "infer" or "inference" refer generally to the process of reasoning about or inferring states of a system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Thus, the predictive data model 514, given particular contextual data, can make inferences relating to solutions and probabilities generated by the solution generator 512 to obtain a correct solution.

The system 500 can further include a dialog component 518 that is employable to question a user relating to particular solutions generated by the solution generator 512. For instance, the dialog component 518 can question a user relating to intent of such user with respect to the object 506. In one particular example, the user may alter the object 506 and/or a hierarchy therein to render dependencies between objects invalid. The dialog component 518 can question the user with respect to the user's intent for the object 506—for instance, the dialog component 518 can inform the user that dependencies have been altered, and thereafter ask the user if such user intends to alter various other dependencies to render the object 506 valid. If the user responds affirmatively, the alarm generator 510 can be informed to disable alarms relating to the subject dependencies until a user context alters (e.g., until the user begins modifications on a disparate project or generates/alters code unrelated to the problematic dependencies). Thus, through the dialog component 518, the predictive data model 514 can obtain still more data relating to a user's operation of the software design tool 502. Accordingly, the predictive model 514 can be updated through utilization of the dialog component 518.

The system 500 further includes a solution implementer 520 that can automatically implement a solution created by the solution generator 512 if the predictive model 514 determines that such solution substantially matches a user's intent. For instance, the solution generator 512 can create a solution with respect to an error found by the validation component 508, and such solution generator in connection with the predictive data model 514 can determine a probability of correctness of the created solution. The solution implementer 520 can thereafter automatically implement the solution if the probability is over that of a defined threshold. The predictive data model 514 can utilize a cost-benefit analysis in connection with determining whether to cause the solution implementer 520 automatically implement a solution that will render the object 506 valid, weighing the cost of implementing an incorrect solution (and causing user confusion) together with benefits of a correct decision. Such costs/benefits can be implemented numerically and analyzed by the predictive data model 514. Furthermore, the predictive data model 514 can inform the solution implementer 520 to ask the user if such solution is correct by way of the dialog component 518. Again, a cost-benefit analysis can be performed, wherein costs associated with disrupting a user are weighted against benefits of ensuring a correct modification to the object 506, thereby rendering such object 506 valid.

While the predictive data model 514 has been described as being utilized in connection with generating and implementing solutions relating to an invalid object or set of objects, the predictive data model 514 can also be employed to optimize usability of the software design tool 502 for particular users. For instance, visual software design tools often include a plurality of display pages, wherein each display page is associated with disparate objects, hierarchies, and the like. An object on a first display page can be altered in a way that retains validity of the object but causes other associated object(s) or structure(s) on disparate pages to become invalid.

Depending on context, it may not always be desirable to inform a user about invalidities of object(s)/structure(s) on disparate displays. The predictive data model 514, however, given contextual data, error/warning type, and various other suitable data can infer which errors/warnings should be presented to a user, even if such errors/warnings relate to object (s) and/or structure(s) on disparate display pages. Other suitable utilizations of the predictive data model in connection with tool usability are also contemplated by the inventors of the subject invention.

Referring to FIGS. 6-9, various methodologies in accordance with various aspects of the subject invention are illustrated. While, for purposes of simplicity of explanation, the methodologies are shown and described as a series of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Figure 6:
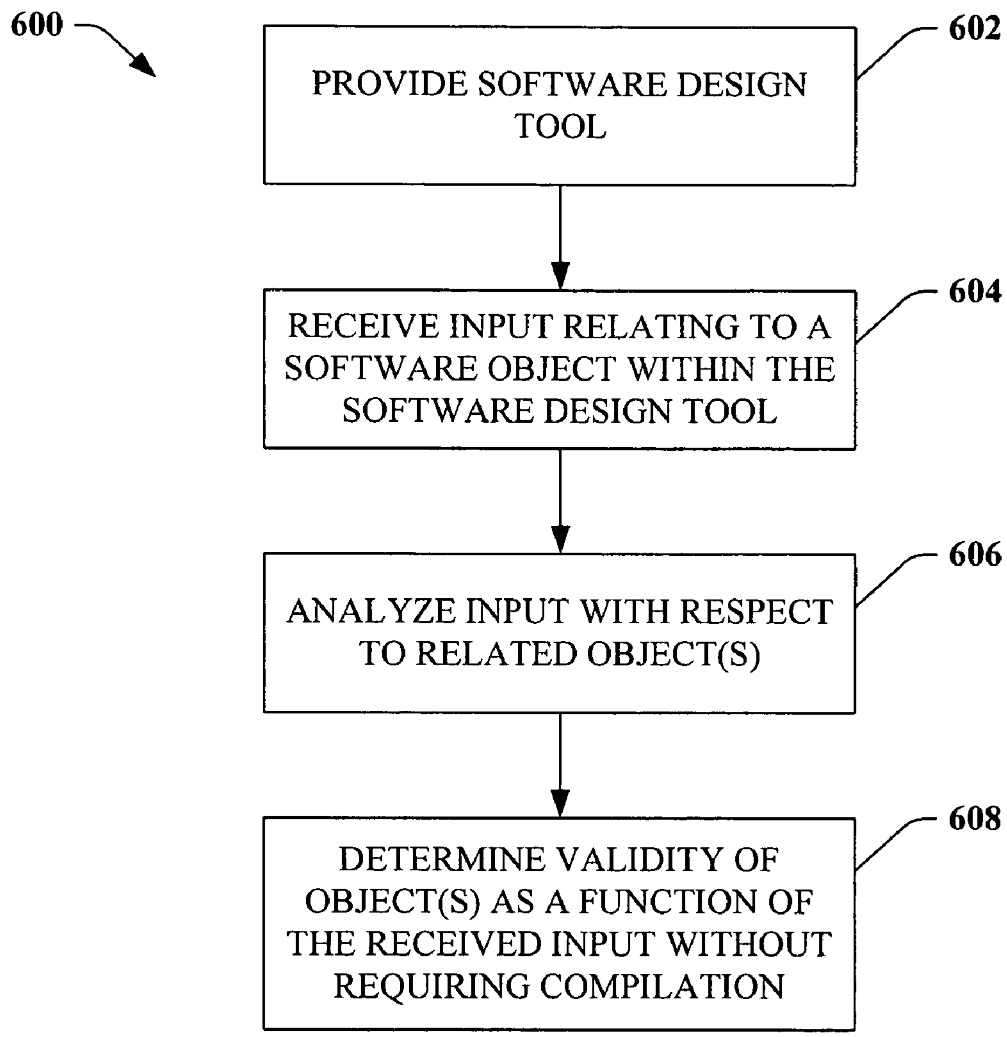
FIG. 6 is a flow diagram illustrating a methodology for determining whether an object in a software design tool is valid in accordance with an aspect of the subject invention.

Now turning solely to FIG. 6, a methodology 600 that facilitates determining validity of one or more objects within a software design tool is illustrated. At 602, a software design tool is provided. The software design tool can be a visual designer, wherein "drag and drop" methodologies can be employed to create/modify a computer program. Furthermore, the software design tool can be text-based, where a developer simply types in code and can review the code via a display. At 604, input relating to an object being created or modified via the design tool is received. For example, a mouse, a keyboard, a microphone, and the like can be utilized in connection with modifying/creating an object, and an interface between such device(s) and a computer can facilitate transferring instructions to the software design tool. The input can relate to attributes, dependencies between objects, a collection of objects that form a structure, or any other suitable property associated with one or more object(s).

At 606, the received input is analyzed together with object (s) affected by such input. For instance, if a dependency of an object is altered by way of the input, the object directly affected by such alteration together with other object(s) affected by such alteration of the dependency are analyzed. The analysis can be prompted by monitoring activity associated with the software design tool. For instance, receipt of the input can prompt the analysis. Similarly, movement of a pointing mechanism, selection of a disparate display page, or any other suitable indicia can initiate the analysis. At 608, validity of the object or objects affected by the input is determined as a function of the received input, wherein the validity is determined without requiring a compilation of the affected objects. This enables a user to be presented with alarms/errors associated with objects and/or other code in real-time, and mitigates occurrences of the user being presented with cascading errors that have gone undetected for a substantial amount of time. Furthermore, the immediate feedback afforded by the methodology 600 facilitates increases development efficiency, as users will be presented with errors as they occur (in contrast to the user being informed of improper coding well after occurrence thereof).

Figure 7:
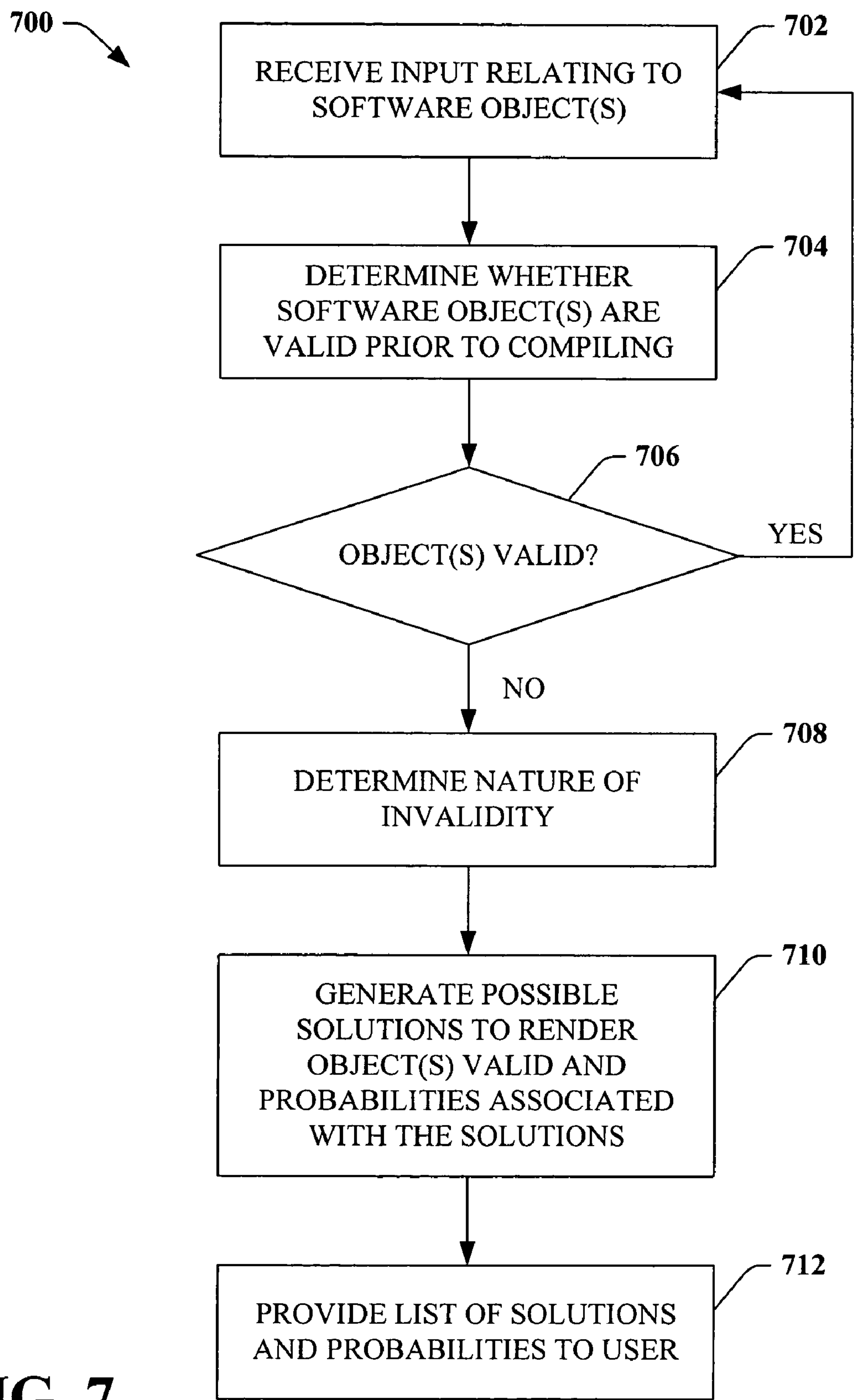
FIG. 7 is a flow diagram illustrating a methodology for providing one or more solutions that will render valid an invalid object in accordance with an aspect of the subject invention.

Turning now to FIG. 7, a methodology 700 that facilitates dynamically validating objects within a software development environment is illustrated. At 702, input relating to one or more software object(s) is received, wherein such input can be initiated from any suitable source (e.g., keyboard, mouse, voice, . . . ). At 704, a determination is made regarding whether the one or more software object(s) are valid prior to compiling such object(s). As discussed supra, conventional object validation systems and methods required a compile to determine whether there were any validity problems with one or more objects, which adversely affects developer efficiency. If the object(s) are found to be valid at 706, then the method returns to 702 where more input is awaited. If one or more object(s) are found to be invalid at 706, then at 708 a nature of the invalidity is determined. For example, it can be determined that disparate levels within a hierarchy improperly utilize a substantially similar attribute. Thus, a fairly precise nature of an error/warning can be determined at 708.

At 710, one or more possible solution(s) are generated, wherein such solution(s) will render the object (determined to be invalid at 706) valid. Furthermore, probabilities of such solution(s) being similarly to a user's intent can further be calculated. For instance, given a current programming context and other user-centric data, as well as a nature of the object invalidity, probabilities associated with acceptable solutions can be calculated. At 712, a list of possible solutions and probabilities associated therewith can be provided to a user. For example, a first solution with a highest calculated probability can be provided at a top of a list, and a solution with a lower calculated probability can be provided beneath the first solution. In accordance with another aspect of the subject invention, only solutions above a defined threshold probability can be presented to a user. Thus, if no solution(s) are associated with an adequate probability, the user will only be presented with an alarm (and will not be presented with possible solutions). Further, if a significant number of solutions exist where the solutions are associated with substantially similar probabilities, the user may be provided with no such solutions.

Figure 8:
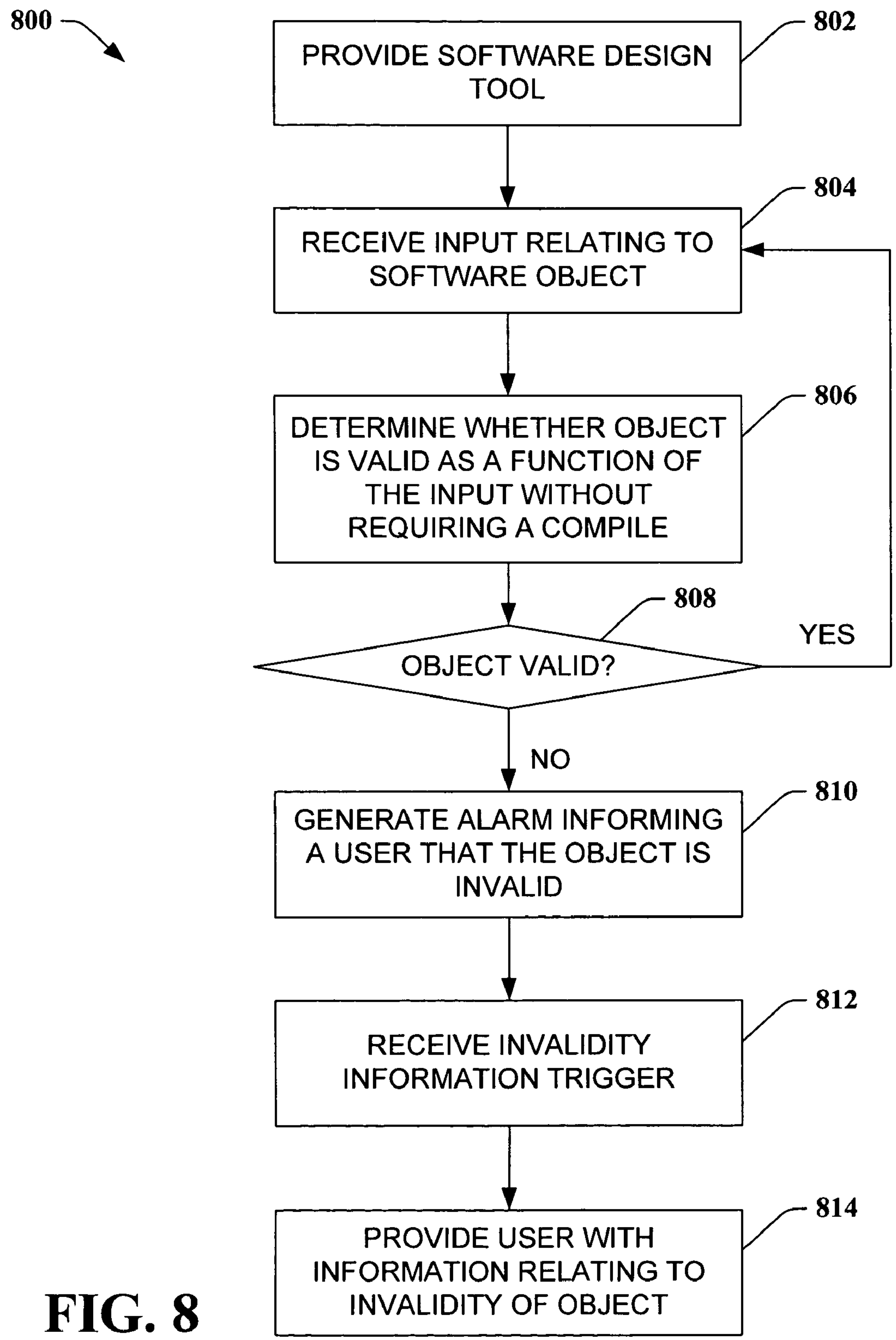
FIG. 8 is a flow diagram illustrating a methodology for providing a user with information relating to an invalid object in accordance with an aspect of the subject invention.

Turning now to FIG. 8, a methodology 800 that facilitates dynamically validating objects within a software design tool is illustrated. At 802, a software design tool is provided. At 804, input with respect to one or more software object(s) are received. For instance, the input can relate to an object, a class, an instance of an object, a hierarchy, a dimension of a hierarchy, or any other suitable element that can be created/modified within the software design tool. At 806, whether the object(s) are valid is determined as a function of the received input, wherein the determination is not premised upon a compile. A decision block 808 directs the methodology 800 back to 804 if the object(s) are valid, and directs the methodology 800 to 810 if one or more object(s) is found to be invalid.

At 810, an alarm is generated informing a user that one or more object(s) are invalid. For instance, text and/or graphics can be underlined, highlighted, or the like to inform the user that the object(s) are invalid. Moreover, the text and/or graphics can be underlined, highlighted, etc. in a manner that allows the user to distinguish between critical errors associated with the object(s) and non-critical warnings associated with the object(s). Furthermore, the alarm can be audible by way of speakers, or can be a combination of a visual and audible alarm. At 812, an invalidity information trigger is received. For example, if the alarm comprises underlining text or graphics of an invalid object, hovering over such underline can be an invalidity information trigger. Similarly, a series of keystrokes, clicks of a mouse, voice commands, or any other suitable command can be utilized as the invalidity information trigger. Upon receiving the invalidity information trigger, invalidity information relating to the invalid object is provided to the user at 814. For instance, detail relating to reasons for invalidity can be provided to the user upon the user generating the invalidity information trigger. Such information can also automatically be presented to a user immediately upon determining that one or more object(s) are invalid if so desired.

Figure 9:
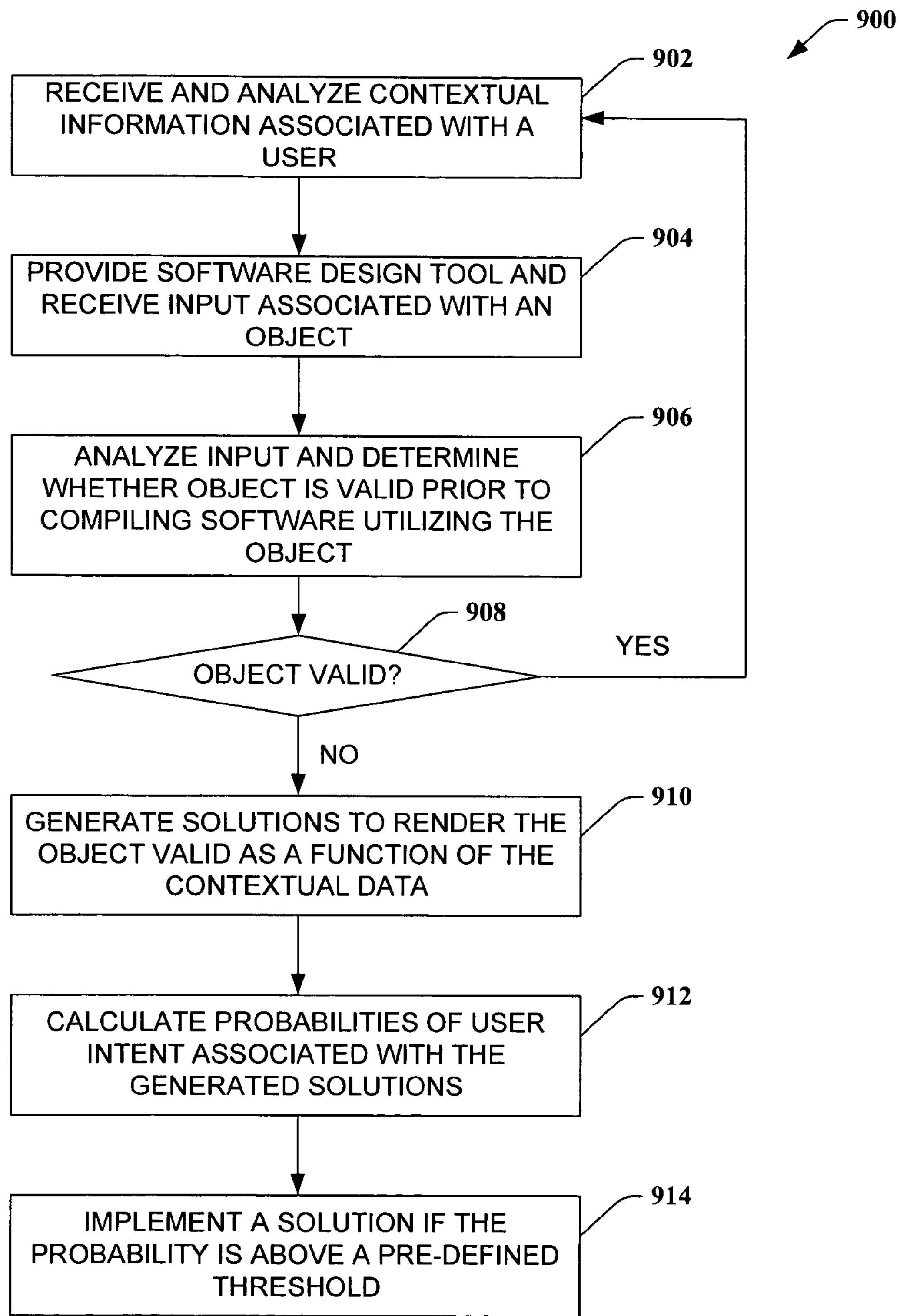
FIG. 9 is a flow diagram illustrating a methodology for automatically implementing a solution associated with an invalid object that will render such object valid in accordance with an aspect of the subject invention.

Referring now to FIG. 9, a methodology for automatically correcting object invalidities without requiring a compile is illustrated. At 902, contextual information associated with a user is received and analyzed. The contextual information can include user identity, user history, current application, time of day, day of week, physical location of user (e.g., at a place of work or at home), and other suitable contextual information. Such information can be analyzed in light of previously received and analyzed information (for example, utilized to generate a Bayesian network). At 904, a software design tool is provided and input associated with one or more object(s) within the software design tool is received. At 906 the input is analyzed and a determination is made regarding whether the object(s) are valid. At 908 a decision block directs the methodology 900 to 902 if the object(s) are found to be valid. If the object(s) are found to be invalid, at 908 a decision block directs the methodology 900 to 910 where solutions are generated to render the object(s) valid. Such solutions are generated as a function of the received contextual data. For example, over time it can be observed that a particular user makes certain errors at specific times of day or days of week. More particularly, a user may improperly define dependencies in a substantially similar manner repeatedly at particular times of different days. Thus, solutions can be generated as a function of the contextual data.

At 912, probabilities of user intent associated with the generated solutions are calculated, wherein the probabilities correlate to probable user intent. For instance, a solution that will render one or more object(s) valid may not correspond to intent of a user with respect to a particular programming project. Thus, in accordance with one aspect of the subject invention, the probabilities can be calculated as a function of a determined cause of invalidity as well as the received and analyzed contextual information. At 914, a solution is implemented if the solution is associated with a calculated probability above a defined threshold. For instance, such threshold can be defined by a user and can be modified at any time by such user. Further, if desired, rather than automatically implement a solution, the user can be provided with such solution and a dialog can occur, wherein the user can affirm that the solution is desirable through the dialog.

Figure 10:
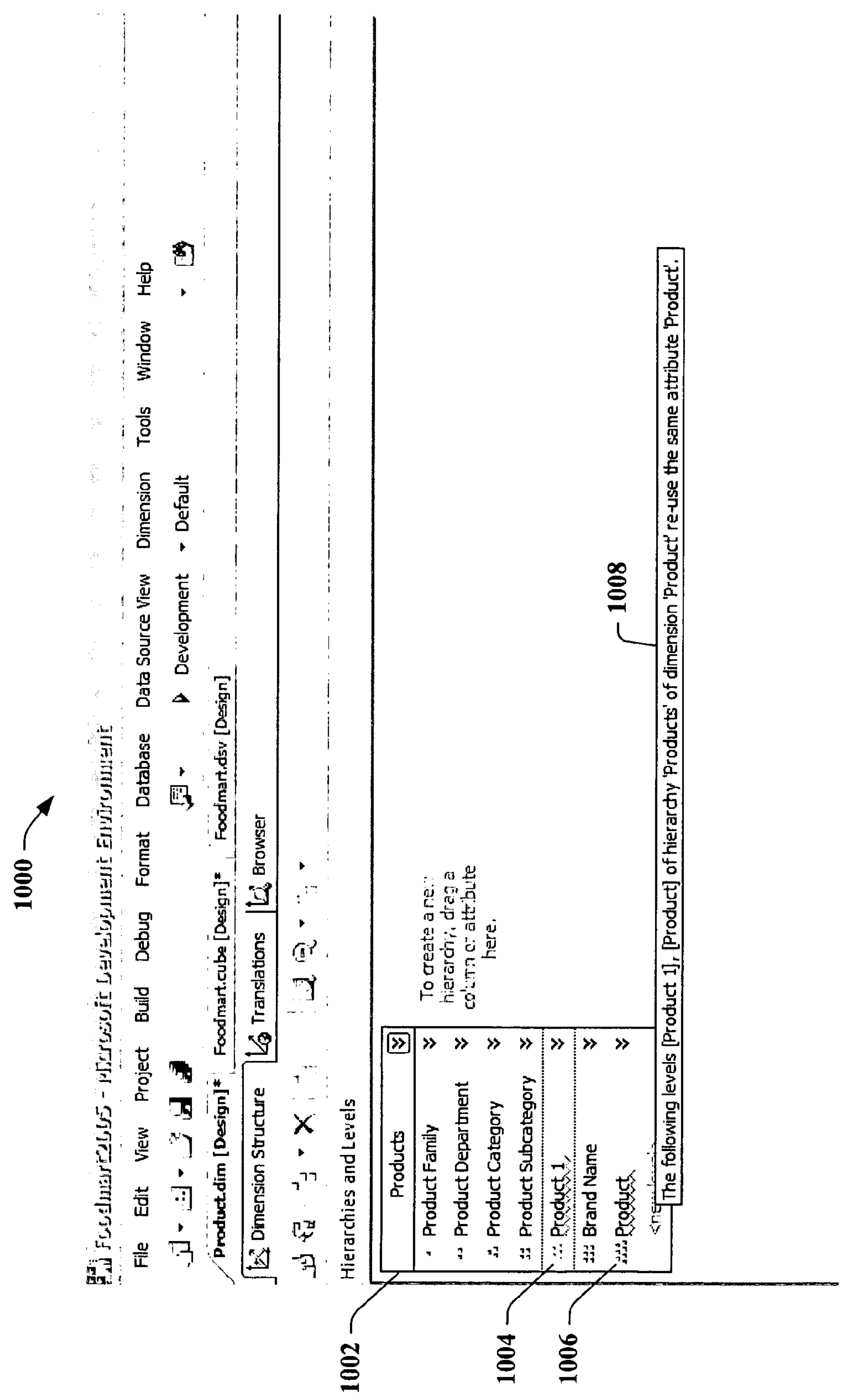
FIG. 10 is an exemplary screenshot illustrating one or more aspects of the subject invention.

Now referring to FIG. 10, an exemplary screenshot 1000 of one exemplary implementation of the subject invention is illustrated. The screenshot 1000 illustrates a hierarchy entitled "Products" 1002, wherein such hierarchy includes a plurality of levels. The levels "Product 1" 1004 and "Product" 1006 of the hierarchy 1002 include errors and/or warnings, where underlines indicate invalidity of the levels 1004 and 1006. Upon activation of a particular trigger, a description 1008 relating to an error/warning associated with one or both of the levels 1004 and 1006 is provided to a user. For instance, upon hovering a mouse over the level 1004, the description 1008 of a reason for invalidity of the level 1004 can be provided to the user. Other triggers for presenting the description 1008 to a user are contemplated and have been described herein.

Figure 11:
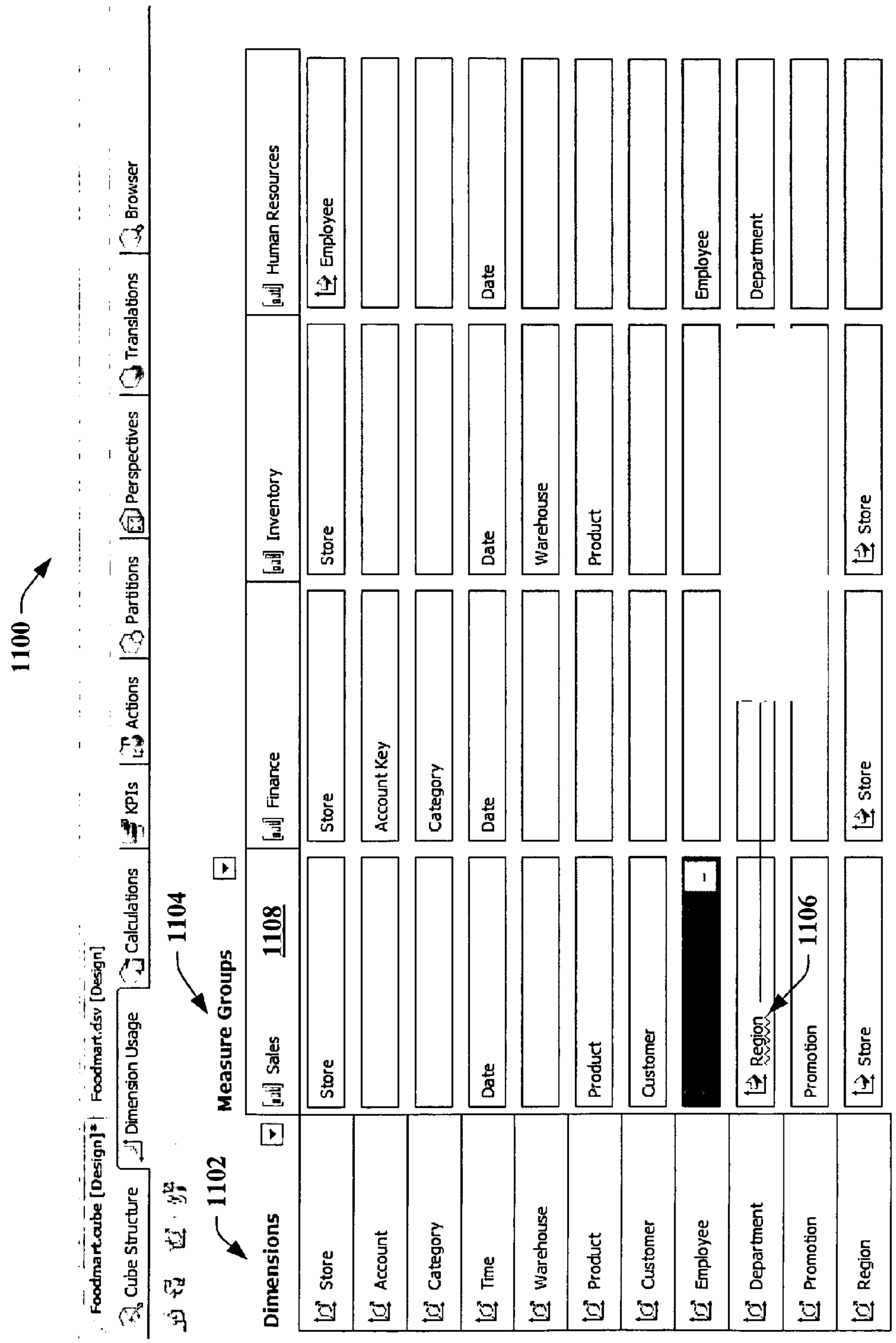
FIG. 11 is another exemplary screenshot illustrating one or more aspects of the subject invention.

Turning now to FIG. 11, another exemplary screenshot 1100 illustrating one or more aspects of the subject invention is illustrated. The screenshot 1100 illustrates a plurality of dimensions 1102 as well as a plurality of measure groups 1104 associated with the dimensions 1102. In this screenshot 1102, a dimension "Region" 1106 associated with the measure group "Sales" 1108 includes an error/warning, which is indicated by underlining such dimension. In this example, the underlined text indicates, in real time, that a validation error exists with respect to the dimension 1106. If a validation information trigger is activated, information relating to the error/warning associated with the dimension 1106 is provided to the user, wherein such information can facilitate correcting the error.

Figure 12:
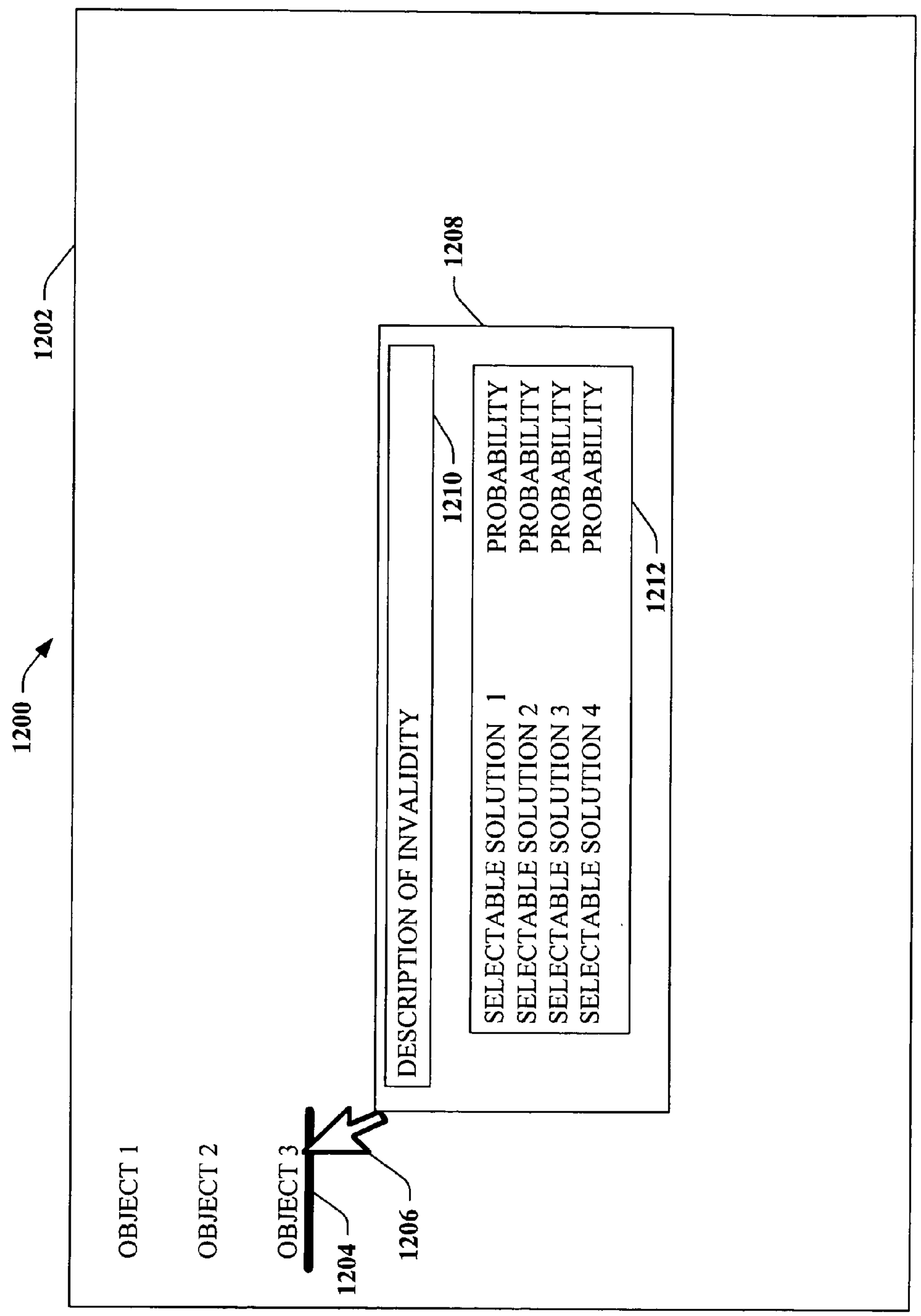
FIG. 12 is one exemplary implementation of one or more aspects of the subject invention.

Referring now to FIG. 12, an exemplary implementation 1200 of the subject invention is illustrated. A software design tool 1202 is graphically displayed to a user on a screen, wherein the user can enter data relating to computer programming that is displayed on such screen. In this example, the software design tool 1202 includes three objects: object 1, object 2, and object 3. Object 3 is associated with validation errors, wherein a line 1204 under object 3 indicates that a validation error exists. A cursor 1206 is hovered over object 3, and on hover a window 1208 can be presented to a user upon the display. The window 1208 can include a description of invalidity 1210 that sufficiently describes to the user reason(s) that object 3 has been labeled as invalid. The window 1208 can also include a list of solutions, wherein the solutions are associated with respective probabilities. Moreover, the solutions are selectable, thereby enabling a user to implement one of the solutions upon selecting such solution with the cursor 1206 or other suitable selection mechanism. Thus, if the user selects one of the solutions, object 3 will be rendered valid and the line 1204 will not appear underneath such object.

Figure 13:
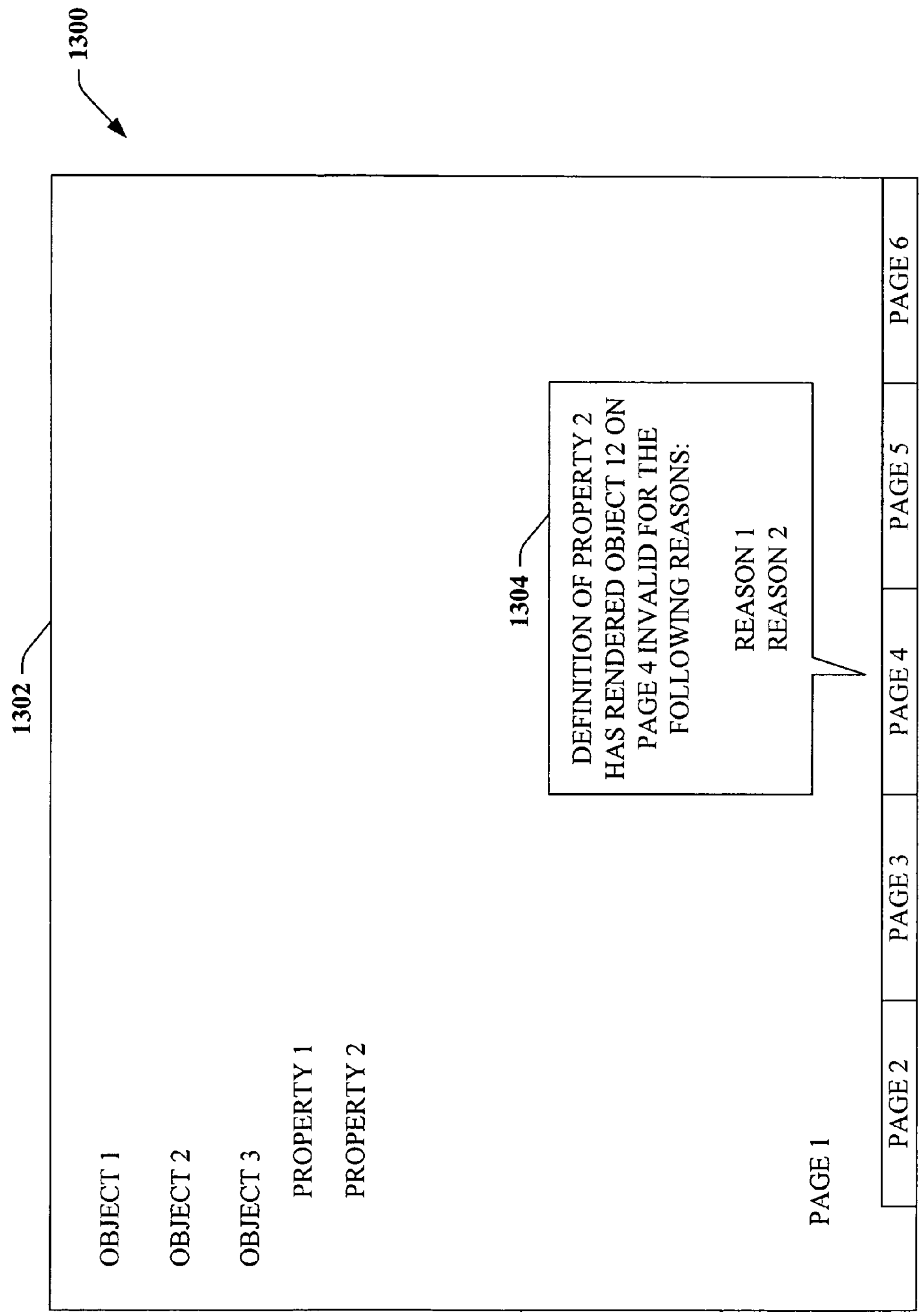
FIG. 13 is another exemplary implementation of one or more aspects of the subject invention.

Now referring to FIG. 13, another exemplary implementation 1300 of the subject invention is illustrated. A software design tool 1302 is graphically displayed to a user on a screen, wherein the user can enter data relating to computer programming that is displayed on such screen. In this example, the software design tool 1302 includes a plurality of display pages, where page 1 is the current selected display page. On display page 1 there are three objects: object 1, object 2, and object 3, wherein object 3 is associated with two properties: property 1 and property 2. As can be determined, there is no alarm that indicates that any of the objects or properties associated therewith is invalid upon display page 1. On display page 4, however, an object dependent upon object 3 has been rendered invalid by the definition of property 2. For instance, a window 1304 can be provided that indicates that there is an invalid object on display page 4. Furthermore, reasons for such invalidity can be provided to the user within the window 1304 and, while not displayed, selectable solutions can also be provided. The window 1304 is presented to the user in real-time, and does not require a compile-command to be presented. Furthermore, particular users may not wish to be presented with alarms associated with objects on disparate pages—therefore, an option can be presented to such user to disable this functionality.

Figure 14:
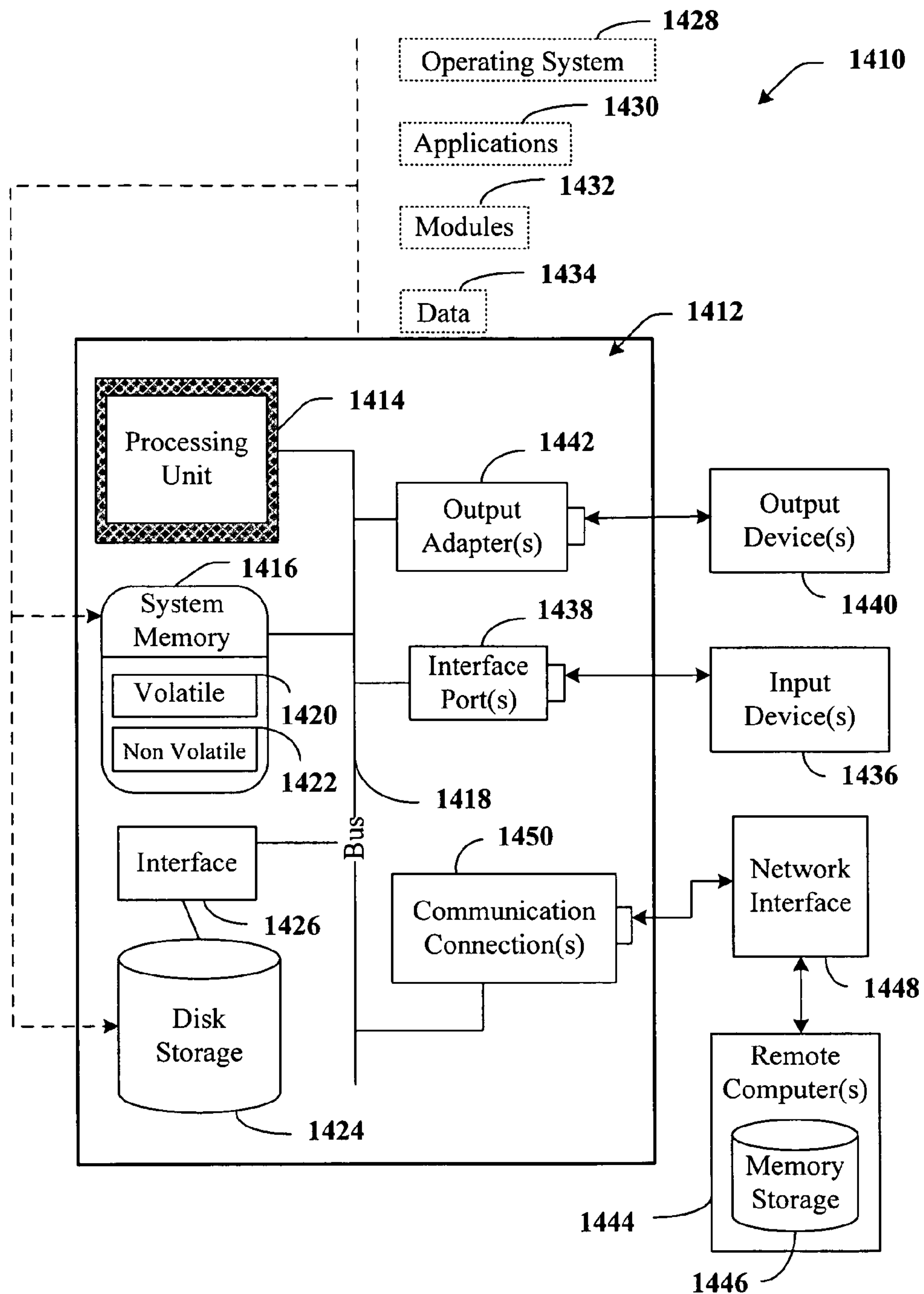
FIG. 14 is an exemplary computing environment that can be utilized in connection with the subject invention.

In order to provide additional context for various aspects of the subject invention, FIG. 14 and the following discussion are intended to provide a brief, general description of a suitable operating environment 1410 in which various aspects of the subject invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1410 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 14, an exemplary environment 1410 for implementing various aspects of the invention includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable ROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/nonremovable, volatile/nonvolatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the subject invention can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapter 1442 is provided to illustrate that there are some output devices 1440 like monitors, speakers, and printers among other output devices 1440 that require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

Figure 15:
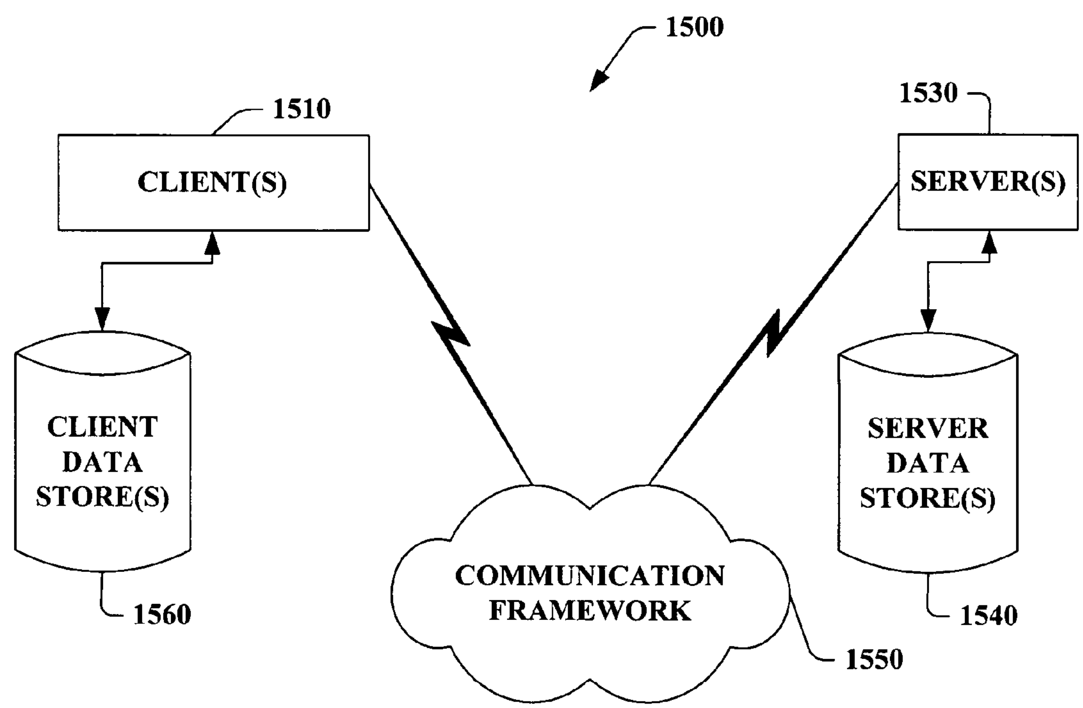
FIG. 15 is an exemplary operating environment that can be employed in connection with the subject invention.

FIG. 15 is a schematic block diagram of a sample-computing environment 1500 with which the subject invention can interact. The system 1500 includes one or more client(s) 1510. The client(s) 1510 can be hardware and/or software (e.g., threads, processes, computing devices). The system 1500 also includes one or more server(s) 1530. The server(s) 1530 can also be hardware and/or software (e.g., threads, processes, computing devices). The servers 1530 can house threads to perform transformations by employing the subject invention, for example. One possible communication between a client 1510 and a server 1530 can be in the form of a data packet adapted to be transmitted between two or more computer processes. The system 1500 includes a communication framework 1550 that can be employed to facilitate communications between the client(s) 1510 and the server(s) 1530. The client(s) 1510 are operably connected to one or more client data store(s) 1560 that can be employed to store information local to the client(s) 1510. Similarly, the server(s) 1530 are operably connected to one or more server data store(s) 1540 that can be employed to store information local to the servers 1530.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system that facilitates validating an object of an object oriented programming language in a software design tool, comprising:

a component of a software design tool that is executing on a processor of a computer that receives user input relating to development of an object, wherein the user input is in an object oriented programming language and is uncompiled, and wherein the user input alters a property of the object that is inherited from one or more other objects having a hierarchical relationship with the object, wherein the object that is altered is defined on a first page in the software design tool and wherein the one or more other objects are defined on one or more different pages than the first page;

a validating component executing on the processor that upon receiving the user input that alters the inherited property and prior to compiling the object automatically determines whether the object is associated with an error by analyzing the user input together with the object and the one or more other objects to determine whether the object's use of the inherited property remains valid after the user input is received;

an alarm generating component that, upon being notified that the object's use of the inherited property is invalid after the user input is received, automatically accesses a user configurable setting that defines whether or not the one or more different pages where the one or more other objects are defined are to be immediately displayed to the user to indicate the invalid use of the property, and wherein upon determining that the user configurable indicates that the one or more different pages are to be immediately displayed, the alarm generating component automatically displays the one or more different pages with an indication in the definition of the one or more other objects of the invalidity of the use of the property in the object.

2. The system of claim 1, further comprising an alarm component that generates an alarm upon the validating component determining that the object is associated with an error.

3. The system of claim 2, further comprising an information presentation component that presents details relating to the alarm to a user.

4. The system of claim 3, the details presented upon the user hovering a pointing mechanism over a visual alarm.

5. The system of claim 1, the software design tool is a visual designer.

6. The system of claim 1, further comprising a solution generating component that provides a user with an action that will correct an error associated with the object if the validation component determines that the object is associated with the error.

7. The system of claim 6, the solution generating component provides the user with a list of actions that will correct an error associated with the object, each of the actions selectable by the user and the error corrected upon a selection of an action by the user.

8. The system of claim 7, an action positioned within the list of actions as a function of a calculated probability that the action represents an intent of the user.

9. The system of claim 1, further comprising a solution generating component that automatically generates an action that corrects an error associated with the object, the solution generating component selects and implements the action if a calculated probability of a user intent is above a predefined threshold.

10. The system of claim 1, further comprising an alarm generator that provides an alarm to a user in real-time if the object is associated with an error.

11. A method performed by a processor of a computer for validating an object of an object oriented programming language within a software design tool, comprising:

monitoring a software design tool for object-related user input that alters a property of an object, the property being inherited from one or more other objects having a hierarchical relationship with the object wherein the user input is in an object oriented programming language and is uncompiled, wherein the object that is altered is defined on a first page in the software design tool, and wherein the one or more other objects are defined on one or more different pages than the first page;

upon receiving the user input that alters the inherited property, determining whether the object's use of the inherited property remains valid after the object-related user input is received but without compiling the object, the determination being performed by the processor;

upon determining that the object's use of the inherited property is invalid after the user input is received, automatically accessing a user configurable setting that defines whether or not the one or more different pages where the one or more other objects are defined are to be immediately displayed to the user to indicate the invalid use of the property;

upon determining that the user configurable setting indicates that the one or more different pages are to be immediately displayed, automatically displaying the one or more different pages with an indication in the definition of the one or more other objects of the invalidity of the use of the property in the object.

12. The method of claim 11, further comprising generating an alarm if the object's use of the inherited property is invalid, the alarm indicates a type of invalidity.

13. The method of claim 12, the alarm indicates that the object is associated with one of a non-critical warning or a critical error.

14. The method of claim 12, further comprising presenting additional information relating to the invalidity to a user upon activation of a pre-defined trigger.

15. The method of claim 12, further comprising presenting one or more actions to a user, the one or more actions if implemented will render the object valid.

16. A computer storage medium storing computer executable instructions which when executed by a processor of a computer system perform steps comprising:

displaying, in an integrated development environment, source code that is written in an object oriented programming language and is uncompiled in a first page in the integrated development environment, the source code including a plurality of object definitions including a first object that inherits from another object of the source code, wherein the other object is defined in a different page in the integrated development environment than the first page;

receiving user input that modifies the source code that defines the first object in the first page including altering a property or method of the first object that causes the first object's inheritance of the other object to no longer be valid;

upon receiving the user input that modifies the source code, detecting the invalid inheritance of the first object without first compiling the source code;

upon detecting the invalid inheritance of the first object, automatically accessing a user configurable setting that defines whether or not the second page where the other object is defined is to be immediately displayed to the user to indicate the invalid use of the property;

upon determining that the user configurable setting indicates that the second page is to be immediately displayed, automatically displaying the second page with an indication in the definition of the other object of the invalidity of the use of the property in the first object;

displaying to the user a question as to whether the user intends to modify other dependencies of the first object;

upon the user affirming that the user intends to modify other dependencies of the first object, suppressing further notifications of invalid inheritance of the first object.

17. The computer storage medium of claim 16, wherein displaying to the user an indication of the invalid inheritance includes presenting possible modifications to the source code that will make the first object inherit properly from the other object.

18. The computer storage medium of claim 16, further comprising periodically scanning the source code to detect errors in the object definitions without first compiling the source code.

* * * * *